H. M. B. BARY.
WEIGHING MACHINE.
APPLICATION FILED SEPT. 21, 1907.
903,044.
Patented Nov. 3, 1908.
2 SHEETS—SHEET 1.
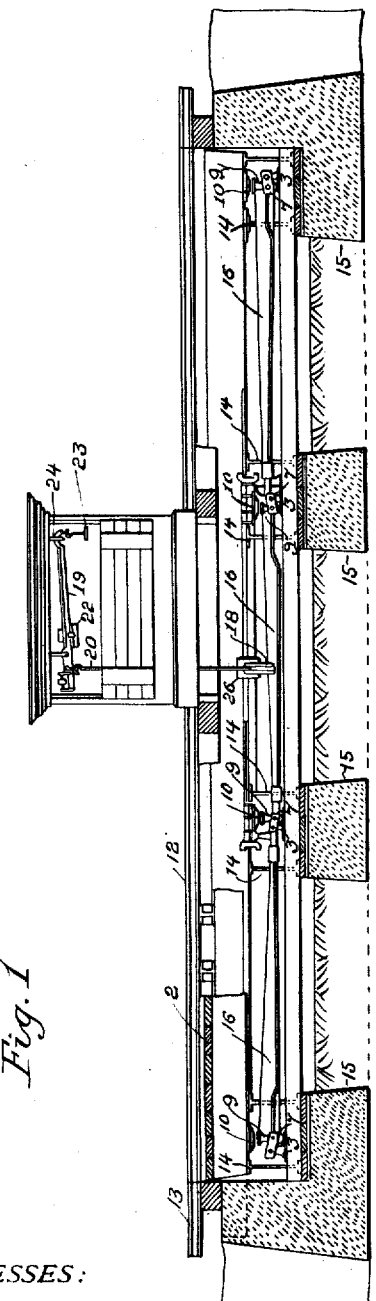
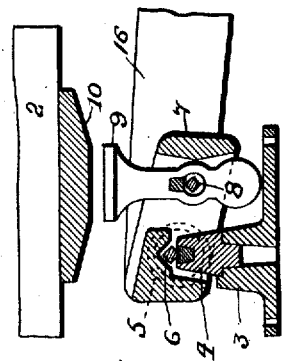
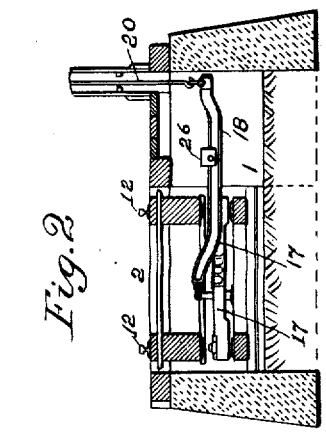
WITNESSES:
INVENTOR
Henry M. B. Bary
BY Connolly Bros.
Attorneys H. M. B. BARY.
WEIGHING MACHINE.
APPLICATION FILED SEPT. 21, 1907.
903,044.
Patented Nov. 3, 1908.
2 SHEETS—SHEET 2.
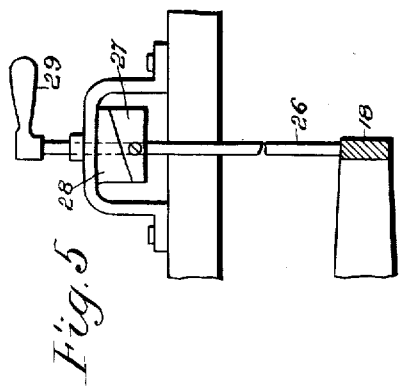
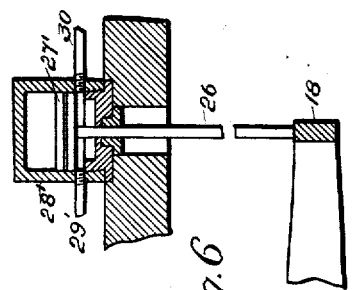
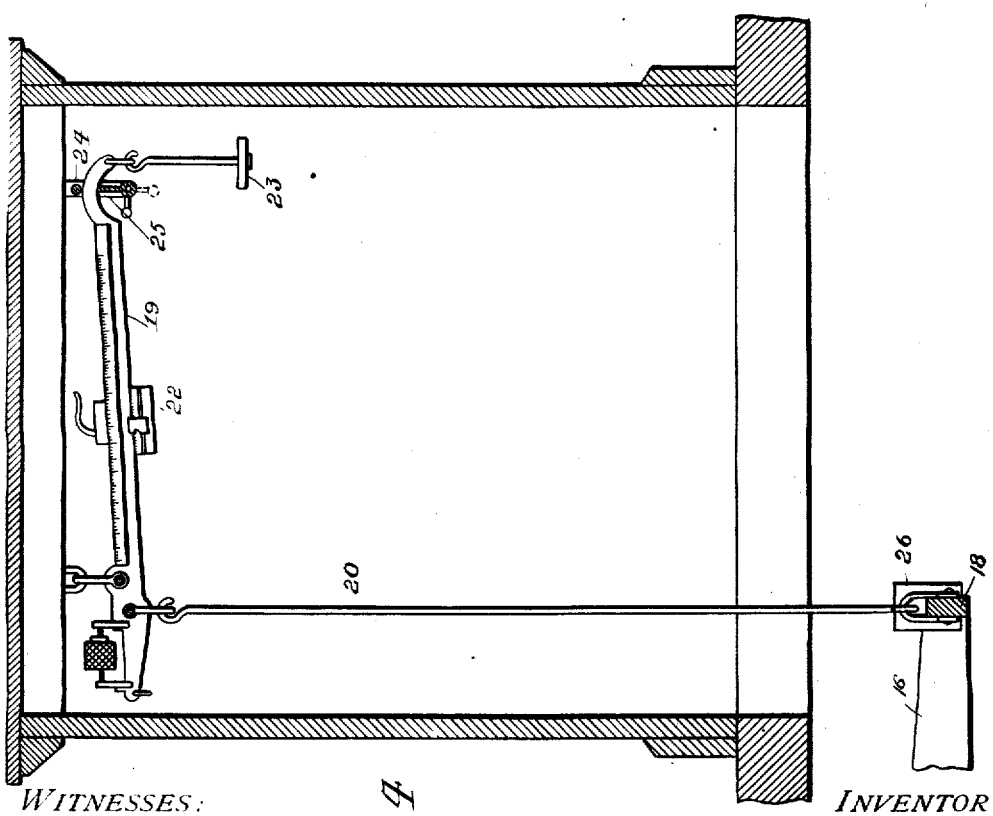

UNITED STATES PATENT OFFICE.

HENRY M. B. BARY, OF PHILADELPHIA, PENNSYLVANIA.

WEIGHING-MACHINE.

No. 903,044.

Specification of Letters Patent.

Patented Nov. 3, 1908.

Application filed September 21, 1907. Serial No. 393,929.

*To all whom it may concern:*

Be it known that I, HENRY M. B. BARY, a citizen of the United States, residing at Philadelphia, in the county of Philadelphia and State of Pennsylvania, have invented certain new and useful Improvements in Weighing-Machines, of which the following is a specification.

This invention has relation to weighing scales and relates in particular to that class of weighing scales wherein provision is made for relieving the knife edges and other delicate parts of the weighing mechanism from the weight of the platform and of the platform and its load at all times except when the actual weighing operation is being performed.

In carrying my present invention into effect I provide stationary supports in which the platform rests while inactive and I provide means for depressing the levers and appurtenant parts of the weighing mechanism at this time and thereby positively separating them from and holding them out of contact with the platform and I also provide means for positively sustaining the free end of the scale beam in an elevated position at the same time so as to prevent the scale beam from descending and thereby elevating the weighing levers and bringing them into contact with the platform, and I also provide suitable contact blocks or plates located respectively on the levers of the weighing mechanism and on the platform or which under some circumstances may be placed either on the levers alone or beneath the platform alone to provide efficient contact points when the platform is being sustained by the weighing mechanism for weighing purposes.

It is a well established and generally known fact that none of the platform scales in use are provided with means that would enable one to lift the platform and its load from its own independent points of support by means of the scale beam itself in order to connect it with the weighing mechanism and impose it and its load upon the weighing levers' knife edges for weighing purposes. Drop levers are in use for this end, but this device cannot be employed for scales such as all kinds of railroad track and wagon platform scales and, therefore, this device is limited but to small platform scales whose platform and its load can be lifted by one or more persons. Now in order to render it quite possible for a person to accomplish this end, and to have any platform scale of all kinds, types and capacities, from the smallest counter platform scale to and inclusive of the largest locomotive platform scale to effect an absolute separation of the platform from the weighing levers at all times, whether the platform is loaded or not, excepting during the operation of actual weighing or simply balancing the scale itself, in my present invention I provide besides the proper independent solid stationary points of support for the scale platform and suitable contact blocks or plates on the weighing levers and on the bottom of the platform, or on either the levers or the bottom of the platform alone a suitable loading of any of the weighing levers with requisite weight that would at once depress sufficiently the weighing levers and thus disconnect and absolutely separate the platform, whether loaded or not, from the weighing levers and thus impose it upon its own, independent points of solid support, the very moment the scale beam is relieved from the weight and the counterpoise upon it, said loading of the levers being intended to effect and control their rapid descent.

I also provide means whereby, instead of loading any of the weighing levers, the requisite downward pressure is exerted upon said weighing levers by supplementary devices operative from a point located on the platform, in the beam box or its equivalent, in which case, when the weight on the scale beam is being removed therefrom, such devices must likewise be adjusted to accomplish a corresponding effect to that produced by the removal of the counterpoise from the scale beam as previously stated.

I have illustrated my invention in the accompanying drawing wherein:

Figure 1 is a vertical longitudinal sectional view of a weighing scale constructed according to my invention. Fig. 2 is a vertical transverse sectional view of the same. Fig. 3 is a fragmentary vertical sectional view on an enlarged scale of a portion of the apparatus shown in Figs. 1 and 2. Fig. 4 is a vertical sectional view on an enlarged scale of another portion of the apparatus shown in Figs. 1 and 2. Fig. 5 is a view similar to Fig. 4 of a modification of my invention. Fig. 6 is a view similar to Fig. 5 of another modification.

I have shown my invention as applied to a well known type of railway track scales but I wish it to be understood that it is equally applicable to other forms of railway track scales and to suspension, wagon and other forms of platform scales.

The weighing mechanism is arranged in a pit 1, below the platform 2 and includes the stationary bearings 3 having bearing blocks 4 upon which are mounted the rock shafts 5, by means of knife edges 6. The rock shafts 5 carry main levers 7 which latter are provided with knife edges 8 and upon the knife edges 8 are mounted contact blocks 9 which are adapted at a certain relative position of parts to bear against contact blocks 10 carried by the platform 2 and at another position are out of contact therewith as will be hereinafter described.

The platform 2 is of the usual construction and carries rails 12 alined with rails 13 of the railway track, but the platform instead of being constantly supported by the weighing mechanism as is usual is independently supported at all times, except when the actual weighing operation is being performed upon I beams 14 which latter are mounted in fixed position upon abutments 15.

The rock shafts 5 carry in addition to the main levers 7, the arms 16 which are connected to the center levers 17 which are in turn connected to the extension lever 18 which latter is connected with the scale beam by the beam rod 20. The beam rod 20 is connected in the usual manner to the scale beam 19 which carries the sliding weights 22 and the counterpoise 23.

The outer or free end of the scale beam, to which the counterpoise is attached passes through the beam rack 24. The beam rack 24 is provided with a pivoted latch 25. In scales as ordinarily constructed the latch in the beam rack is arranged over the end of the beam, so that when the latch is in its closed position it will hold the end of the beam in a depressed position that is somewhat below a horizontal line, but in my improvement the latch is arranged above the end of the beam so that when the latch is in its vertical or closed position the end of the beam will be held up by the latch so that it will stand at a position somewhat above a horizontal line, it being understood that the proper weighing position of the beam is when it is on an exactly horizontal line.

While the counterpoise 23 is of the usual construction I make it slightly heavier than usual as I incorporate into it sufficient additional weight to counter balance a weight 26 with which the extension lever 18 is loaded, the purpose of the loading of the extension lever being to depress this lever positively and, by reason of its connection with the main levers of the weighing mechanism, to depress the main levers and separate the contact blocks on the main levers from the contact blocks on the platform when the sliding weight is at zero and the beam has been elevated by means of the latch in the beam rack.

The operation of the apparatus as above described is as follows: When in its inactive position, that is when the weighing operation is not being performed, the latch 25 is in the position shown in full lines in Fig. 4, and holds the free end of the scale beam up so that the scale beam is inclined upwardly from its pivoted point or fulcrum to its free end. At this position of the scale beam the weight 26 acting on the extension lever 18 holds the latter down and the main levers will also be held down so that the contact blocks 9 carried by the main levers will be out of contact with the contact blocks 10 carried by the platform. At this position of parts the platform 2 rests on its stationary supports, that is, upon the I beams 14 and cars may be run on, off or over the platform without in any manner affecting the weighing mechanism. When it is desired to weigh any object, say for instance a car, it is run upon the platform and allowed to come to rest thereon. The latch 25 is now turned to a horizontal position thus freeing the end of the scale beam which at once drops to a position slightly above a horizontal position, the additional weight incorporated in the counterpoise overcoming the weight added to the extension lever and this preliminary movement of the scale beam therefore causing the main levers to be elevated so as to bring the contact blocks on the main levers into contact with the contact blocks on the platform. The sliding weight is now moved along the beam until it depresses the beam to a horizontal position, this depression of the beam having the effect of bodily raising the platform and its load, and the weight of the platform and its load being now sustained wholly by the weighing mechanism. When the scale beam has reached the horizontal position the parts are in equilibrium and the weight of the car or other load is ascertained by examining the scale on the beam. After the weighing has been accomplished the sliding weight on the scale beam is run back to zero thus permitting the scale beam to rise slightly and this movement permitting the platform to descend until it rests upon its stationary supports. The latch 25 is now turned up to a vertical position thus raising the end of the scale beam and allowing the weight on the extension lever to depress the same and this depression of the extension lever effecting a simultaneous depression of the main levers and their contact blocks so as to separate the latter from the contact blocks on the platform. As the platform is now wholly out of contact with the weighing mechanism the car can now be run off without imposing any jar, shock, wear or movement to any part of the weighing mechanism. While I have shown the counterpoise at the outer or free end of the scale beam it is to be understood that my improvement is equally applicable to beam scales of other constructions.

While the above described construction is the preferable one and is the simplest and most economical manner of accomplishing the desired result, I have devised modified forms of my invention and have illustrated the same in Figs. 5 and 6.

In the construction shown in these figures I dispense with the latch beneath the end of the scale beam and also dispense with the additional weight which in the previous construction I incorporated with the counterpoise and in lieu thereof I provide means for positively depressing the extension lever such means as shown in Fig. 5 consisting of a rod 26 which is mounted at any convenient point on the platform the beam box or its equivalent, and bears at its end upon top of the extension lever and which carries a cam 27 that bears against a stationary cam 28, the rod 26 also carrying a handle 29 by means of which it can be rotated and the rotation of the rod serving, by the action of the cams, to raise or lower it accordingly as the handle is turned in one direction or the other and thereby depress the extension lever or permit it to rise as the case may be, this raising or lowering of the lever having the same effect as the raising and lowering of the same by means shown in Figs. 1 and 2.

In Fig. 6 I have shown the rod 26 connected to a plunger 27' contained within a cylinder 28' which is provided with an inlet pipe 29' and an exhaust pipe 30 by means of which any suitable fluid under pressure can be admitted to and exhausted from the cylinder so as to raise and lower the plunger and thereby cause the rod 26 to depress the extension lever or permit the same to rise and affect the action described in referring to Fig. 5.

While I have described the levers of the weighing mechanism and the platform as being both provided with contact blocks, I wish it to be understood that under some conditions, as hereinbefore stated contact blocks may be placed either on the levers alone or on the platform alone.

I claim:

1. In weighing scales the combination of a load supporting member and stationary supports therefor, with a weighing member supported on knife edges, contact blocks or plates interposed between and carried by one of said members and pivotally connected thereto and normally out of contact with the opposing member, a scale beam and connections between the scale beam and the weighing member for bringing said contact block into contact with the opposing member.

2. In a platform weighing scale, the combination of loaded weighing levers, a scale beam, a platform, independent supports for the platform, means for bringing said loaded weighing levers into and out of operative relation to the platform, contact blocks or plates carried by the platform and contact blocks or plates carried by the weighing levers.

3. In a platform weighing scale, the combination of a platform, stationary supports for the platform, weighing levers adapted to be moved into and out of operative relation to the platform, means for exerting a downward pressure on the weighing levers operable from above the top of the platform, contact blocks or plates located respectively on the weighing levers and on the bottom of the platform.

4. In weighing scales, the combination of a load supporting member and stationary supports therefor with a weighing member and contact blocks or plates interposed between and carried by one of said members a scale beam connected to the weighing member, and means for neutralizing the operations of the scale beam when the load supporting member rests on its supports.

5. In weighing scales, the combination with the platform and stationary supports for the same, of weighing mechanism adapted to be brought into and out of operative relation to the platform, a scale beam connected to said weighing mechanism and adapted by its movement to bring the weighing mechanism into and out of operative relation to the platform and means for sustaining the free end of the scale beam in elevated position when the platform rests upon its stationary supports.

6. In weighing scales, the combination with the platform and stationary supports for the same, of weighing mechanism including a scale beam adapted to be brought into and out of operative relation to the platform, said scale beam constituting the medium through which the weighing mechanism is brought into and out of operative relation to the platform and means for positively depressing the levers of the weighing mechanism and thereby neutralizing the operation of the scale beam when the platform rests on its supports.

In testimony whereof I have affixed my signature, in presence of two witnesses.

HENRY M. B. BARY.

Witnesses:
 CLYDE B. WEIKERT,
 JOS. B. CONNOLLY.